US009619172B1

(12) United States Patent
Natanzon et al.

(10) Patent No.: US 9,619,172 B1
(45) Date of Patent: Apr. 11, 2017

(54) METHOD AND SYSTEM FOR MANAGING CHANGED BLOCK TRACKING AND CONTINUOUS DATA PROTECTION REPLICATION

(71) Applicant: EMC Corporation, Hopkinton, MA (US)

(72) Inventors: Assaf Natanzon, Tel Aviv (IL); Saar Cohen, Moshav (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 86 days.

(21) Appl. No.: 14/492,506

(22) Filed: Sep. 22, 2014

(51) Int. Cl.
G06F 3/06 (2006.01)

(52) U.S. Cl.
CPC ............ *G06F 3/065* (2013.01); *G06F 3/0604* (2013.01); *G06F 3/064* (2013.01); *G06F 3/0683* (2013.01); *G06F 2003/0697* (2013.01)

(58) Field of Classification Search
CPC ............ G06F 11/1456; G06F 11/2074; G06F 11/2071; G06F 11/2082
See application file for complete search history.

(56) References Cited

U.S. PATENT DOCUMENTS

| 7,516,287 | B2* | 4/2009 | Ahal | G06F 11/1471 711/162 |
|---|---|---|---|---|
| 8,271,447 | B1* | 9/2012 | Natanzon | G06F 11/1471 707/655 |
| 8,332,687 | B1* | 12/2012 | Natanzon | G06F 11/1471 709/202 |
| 8,335,761 | B1* | 12/2012 | Natanzon | G06F 11/1471 707/626 |
| 8,433,869 | B1* | 4/2013 | Natanzon | G06F 3/065 707/634 |
| 8,495,304 | B1* | 7/2013 | Natanzon | G06F 11/1453 711/133 |
| 8,521,691 | B1* | 8/2013 | Natanzon | G06F 17/30017 707/640 |
| 8,521,694 | B1* | 8/2013 | Natanzon | G06F 17/30017 707/649 |
| 8,543,609 | B1* | 9/2013 | Natanzon | G06F 3/0605 707/791 |
| 8,732,417 | B1* | 5/2014 | Stringham | G06F 11/1448 711/162 |
| 2008/0082770 | A1* | 4/2008 | Ahal | G06F 11/1471 711/162 |
| 2009/0300305 | A1* | 12/2009 | Liu | G06F 11/1466 711/162 |
| 2010/0005259 | A1* | 1/2010 | Prahlad | G06F 11/1435 711/162 |
| 2012/0072659 | A1* | 3/2012 | Wade | G06F 11/1453 711/112 |

(Continued)

*Primary Examiner* — Shawn X Gu
*Assistant Examiner* — Jean Edouard
(74) *Attorney, Agent, or Firm* — Krishnendu Gupta; Robert Kevin Perkins; Andre Gibbs

(57) ABSTRACT

Example embodiments of the present invention relate to a method, a system, and a computer program product for transitioning between replication technologies. The method includes performing continuous data protection in a data protection environment, transitioning from continuous data protection to changed block tracking in the data protection environment, and performing changed block tracking in the data protection environment.

21 Claims, 10 Drawing Sheets

(56) References Cited

U.S. PATENT DOCUMENTS

| | | | |
|---|---|---|---|
| 2012/0221807 A1* | 8/2012 | Wade | G06F 9/45558 |
| | | | 711/154 |
| 2013/0103650 A1* | 4/2013 | Natanzon | G06F 17/30008 |
| | | | 707/684 |
| 2014/0006858 A1* | 1/2014 | Helfman | G06F 11/1448 |
| | | | 714/19 |
| 2014/0074790 A1* | 3/2014 | Berman | G06F 17/3007 |
| | | | 707/649 |
| 2014/0201162 A1* | 7/2014 | Kumarasamy | G06F 11/1469 |
| | | | 707/679 |
| 2015/0363270 A1* | 12/2015 | Hammer | G06F 11/1451 |
| | | | 711/162 |

\* cited by examiner

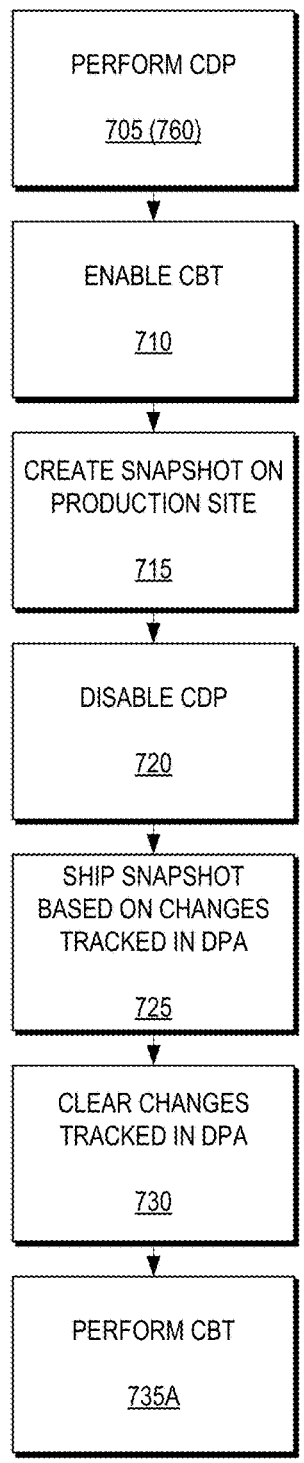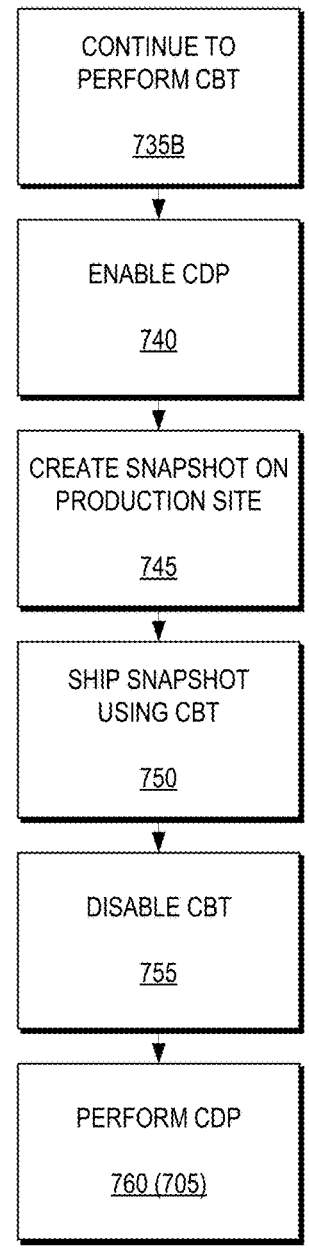
FIG. 7A
FIG. 7B

METHOD AND SYSTEM FOR MANAGING CHANGED BLOCK TRACKING AND CONTINUOUS DATA PROTECTION REPLICATION

A portion of the disclosure of this patent document may contain command formats and other computer language listings, all of which are subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

This application relates to data replication.

BACKGROUND

Computer data is vital to today's organizations, and a significant part of protection against disasters is focused on data protection. As solid-state memory has advanced to the point where cost of memory has become a relatively insignificant factor, organizations can afford to operate with systems that store and process terabytes of data.

Conventional data protection systems include tape backup drives, for storing organizational production site data on a periodic basis. Such systems suffer from several drawbacks. First, they require a system shutdown during backup, since the data being backed up cannot be used during the backup operation. Second, they limit the points in time to which the production site can recover. For example, if data is backed up on a daily basis, there may be several hours of lost data in the event of a disaster. Third, the data recovery process itself takes a long time.

Another conventional data protection system uses data replication, by creating a copy of the organization's production site data on a secondary backup storage system, and updating the backup with changes. The backup storage system may be situated in the same physical location as the production storage system, or in a physically remote location. Data replication systems generally operate either at the application level, at the file system level, at the hypervisor level or at the data block level.

Current data protection systems try to provide continuous data protection, which enable the organization to roll back to any specified point in time within a recent history. Continuous data protection systems aim to satisfy two conflicting objectives, as best as possible; namely, (i) minimize the down time, in which the organization production site data is unavailable, during a recovery, and (ii) enable recovery as close as possible to any specified point in time within a recent history.

Continuous data protection typically uses a technology referred to as "journaling," whereby a log is kept of changes made to the backup storage. During a recovery, the journal entries serve as successive "undo" information, enabling rollback of the backup storage to previous points in time. Journaling was first implemented in database systems, and was later extended to broader data protection.

One challenge to continuous data protection is the ability of a backup site to keep pace with the data transactions of a production site, without slowing down the production site. The overhead of journaling inherently requires several data transactions at the backup site for each data transaction at the production site. As such, when data transactions occur at a high rate at the production site, the backup site may not be able to finish backing up one data transaction before the next production site data transaction occurs. If the production site is not forced to slow down, then necessarily a backlog of un-logged data transactions may build up at the backup site. Without being able to satisfactorily adapt dynamically to changing data transaction rates, a continuous data protection system chokes and eventually forces the production site to shut down.

SUMMARY

Example embodiments of the present invention relate to a method, a system, and a computer program product for transitioning between replication technologies. The method includes performing continuous data protection in a data protection environment, transitioning from continuous data protection to changed block tracking in the data protection environment, and performing changed block tracking in the data protection environment.

BRIEF DESCRIPTION OF THE DRAWINGS

Objects, features, and advantages of embodiments disclosed herein may be better understood by referring to the following description in conjunction with the accompanying drawings. The drawings are not meant to limit the scope of the claims included herewith. For clarity, not every element may be labeled in every Figure. The drawings are not necessarily to scale, emphasis instead being placed upon illustrating embodiments, principles, and concepts. Thus, features and advantages of the present disclosure will become more apparent from the following detailed description of exemplary embodiments thereof taken in conjunction with the accompanying drawings in which:

FIGS. 7A and 7B are flow diagrams illustrating methods for transitioning replication technologies from continuous data protection to changed block tracking and transitioning replication technologies from changed block tracking to continuous data protection, respectively, according to respective example embodiments of the present invention;

DETAILED DESCRIPTION

Figure 1:
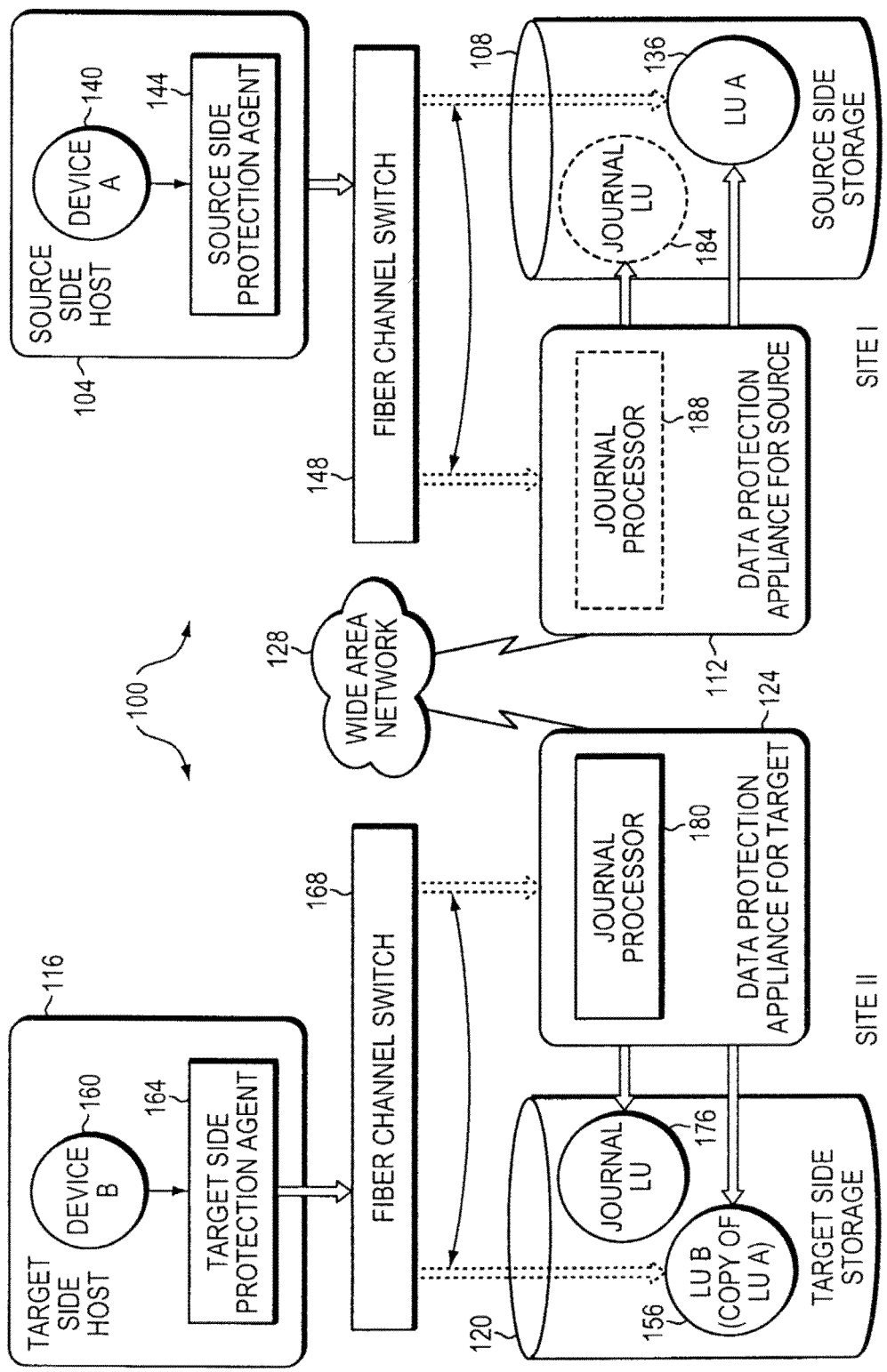
FIG. 1 is a block diagram of a data protection system according to an example embodiment of the present invention.

The following definitions are employed throughout the specification and claims.

BACKUP SITE—a facility where replicated production site data is stored; the backup site may be located in a remote site or at the same location as the production site;

BLOCK VIRTUALIZATION—may be a layer which take back end storage volumes and, by slicing, concatenating and striping, creates a new set of volumes that serve as base volumes or devices in the virtualization layer;

CLONE—a clone may be a copy or clone of the image or images, drive or drives of a first location at a second location;

CONTINUOUS DATA PROTECTION (CDP)—may refer to a full replica of a volume or a set of volumes along with a journal which allows any point in time access, the CDP copy is at the same site, and may be in the same storage array as the production volume;

CONTINUOUS REMOTE REPLICATION (CRR)—may refer to a full replica of a volume or a set of volumes along with a journal which allows any point in time access at a site remote to the production volume and on a separate storage array;

DATA PROTECTION APPLIANCE (DPA)—a computer or a cluster of computers that serve as a data protection appliance, responsible for data protection services including inter alia data replication of a storage system, and journaling of I/O requests issued by a host computer to the storage system;

DELTA MARKING STREAM—may mean the tracking of the delta between the production and replication site, which may contain the meta data of changed locations, the delta marking stream may be kept persistently on the journal at the production site of the replication, based on the delta marking data the DPA knows which locations are different between the production and the replica and transfers them to the replica to make both sites identical;

DISTRIBUTED MIRROR—may be a mirror of a volume across a distance, either metro- or geo-, which is accessible at all sites;

FAIL ALL MODE—may be a mode of a volume in the splitter where all write and read I/Os intercepted by the splitter are failed to the host, but other SCSI command, like read capacity, are served;

GLOBAL FAIL ALL MODE—may be a mode of a volume in the virtual layer where all write and read I/Os to the virtual layer are failed to the host, but other SCSI commands, like read capacity, are served;

HOST—at least one computer or networks of computers that runs at least one data processing application that issues I/O requests to one or more storage systems; a host is an initiator with a SAN;

HOST DEVICE—an internal interface in a host, to a logical storage unit;

IMAGE—a copy of a logical storage unit at a specific point in time;

INITIATOR—a node in a SAN that issues I/O requests;

JOURNAL—a record of write transactions issued to a storage system; used to maintain a duplicate storage system, and to rollback the duplicate storage system to a previous point in time;

LOGGED ACCESS—may be an access method provided by the appliance and the splitter in which the appliance rolls the volumes of the consistency group to the point in time the user requested and let the host access the volumes in a copy on first write base;

LOGICAL UNIT—a logical entity provided by a storage system for accessing data from the storage system;

LUN—a logical unit number for identifying a logical unit;

MARKING ON SPLITTER—may be a mode in a splitter where intercepted I/Os are not split to an appliance and the storage, but rather changes (meta data) are tracked in a list and/or a bitmap and I/Os are sent immediately down the I/O stack;

PHYSICAL STORAGE UNIT—a physical entity, such as a disk or an array of disks, for storing data in storage locations that can be accessed by address;

PRODUCTION SITE—a facility where one or more host computers run data processing applications that write data to a storage system and read data from the storage system;

REPLICATION PROTECTION APPLIANCE (RPA)—another name for DPA;

SAN—a storage area network of nodes that send and receive I/O and other requests, each node in the network being an initiator or a target, or both an initiator and a target;

SOURCE SIDE—a transmitter of data within a data replication workflow, during normal operation a production site is the source side; and during data recovery a backup site is the source side;

SNAPSHOT—a Snapshot may refer to differential representations of an image, i.e. the snapshot may have pointers to the original volume, and may point to log volumes for changed locations. Snapshots may be combined into a snapshot array, which may represent different images over a time period;

SPLITTER/PROTECTION AGENT—may be an agent running either on a production host a switch or a storage array which can intercept IO and split them to a DPA and to the storage array, fail IO redirect IO or do any other manipulation to the IO;

STORAGE MEDIUM—may refer to one or more storage mediums such as a hard drive, a combination of hard drives, flash storage, combinations of flash storage, combinations of hard drives, flash, and other storage devices, and other types and combinations of computer readable storage mediums including those yet to be conceived; a storage medium may also refer both physical and logical storage mediums and may include multiple level of virtual to physical mappings and may be or include an image or disk image;

STORAGE SYSTEM—a SAN entity that provides multiple logical units for access by multiple SAN initiators;

TARGET—a node in a SAN that replies to I/O requests;

TARGET SIDE—a receiver of data within a data replication workflow; during normal operation a back site is the target side, and during data recovery a production site is the target side;

VIRTUAL ACCESS—may be an access method provided by the appliance and the splitter in which the appliance exposes a virtual volume from a specific point in time to the host, the data for the virtual volume is partially stored on the remote copy and partially stored on the journal;

VIRTUAL VOLUME—may be a volume which is exposed to a host by a virtualization layer and may span across more than one site; and WAN—a wide area network that connects local networks and enables them to communicate with one another, such as the Internet.

Description of Embodiments Using a Five State Journaling Process

FIG. 1 is a simplified illustration of a data protection system 100, in accordance with an embodiment of the present invention. Shown in FIG. 1 are two sites; Site I, which is a production site, on the right, and Site II, which is a backup site, on the left. Under normal operation the production site is the source side of system 100, and the backup site is the target side of the system. The backup site is responsible for replicating production site data. Additionally, the backup site enables rollback of Site I data to an earlier pointing time, which may be used in the event of data corruption of a disaster, or alternatively in order to view or to access data from an earlier point in time.

During normal operations, the direction of replicate data flow goes from source side to target side. It is possible, however, for a user to reverse the direction of replicate data flow, in which case Site I starts to behave as a target backup site, and Site II starts to behave as a source production site. Such change of replication direction is referred to as a "failover". A failover may be performed in the event of a disaster at the production site, or for other reasons. In some data architectures, Site I or Site II behaves as a production site for a portion of stored data, and behaves simultaneously as a backup site for another portion of stored data. In some data architectures, a portion of stored data is replicated to a backup site, and another portion is not.

The production site and the backup site may be remote from one another, or they may both be situated at a common site, local to one another. Local data protection has the advantage of minimizing data lag between target and source, and remote data protection has the advantage is being robust in the event that a disaster occurs at the source side.

The source and target sides communicate via a wide area network (WAN) 128, although other types of networks are also adaptable for use with the present invention.

In accordance with an embodiment of the present invention, each side of system 100 includes three major components coupled via a storage area network (SAN); namely, (i) a storage system, (ii) a host computer, and (iii) a data protection appliance (DPA). Specifically with reference to FIG. 1, the source side SAN includes a source host computer 104, a source storage system 108, and a source DPA 112. Similarly, the target side SAN includes a target host computer 116, a target storage system 120, and a target DPA 124.

Generally, a SAN includes one or more devices, referred to as "nodes". A node in a SAN may be an "initiator" or a "target", or both. An initiator node is a device that is able to initiate requests to one or more other devices; and a target node is a device that is able to reply to requests, such as SCSI commands, sent by an initiator node. A SAN may also include network switches, such as fiber channel switches. The communication links between each host computer and its corresponding storage system may be any appropriate medium suitable for data transfer, such as fiber communication channel links.

In an embodiment of the present invention, the host communicates with its corresponding storage system using small computer system interface (SCSI) commands.

System 100 includes source storage system 108 and target storage system 120. Each storage system includes physical storage units for storing data, such as disks or arrays of disks. Typically, storage systems 108 and 120 are target nodes. In order to enable initiators to send requests to storage system 108, storage system 108 exposes one or more logical units (LU) to which commands are issued. Thus, storage systems 108 and 120 are SAN entities that provide multiple logical units for access by multiple SAN initiators.

Logical units are a logical entity provided by a storage system, for accessing data stored in the storage system. A logical unit is identified by a unique logical unit number (LUN). In an embodiment of the present invention, storage system 108 exposes a logical unit 136, designated as LU A, and storage system 120 exposes a logical unit 156, designated as LU B.

In an embodiment of the present invention, LU B is used for replicating LU A. As such, LU B is generated as a copy of LU A. In one embodiment, LU B is configured so that its size is identical to the size of LU A. Thus for LU A, storage system 120 serves as a backup for source side storage system 108. Alternatively, as mentioned hereinabove, some logical units of storage system 120 may be used to back up logical units of storage system 108, and other logical units of storage system 120 may be used for other purposes. Moreover, in certain embodiments of the present invention, there is symmetric replication whereby some logical units of storage system 108 are used for replicating logical units of storage system 120, and other logical units of storage system 120 are used for replicating other logical units of storage system 108.

System 100 includes a source side host computer 104 and a target side host computer 116. A host computer may be one computer, or a plurality of computers, or a network of distributed computers, each computer may include inter alia a conventional CPU, volatile and non-volatile memory, a data bus, an I/O interface, a display interface and a network interface. Generally a host computer runs at least one data processing application, such as a database application and an e-mail server.

Generally, an operating system of a host computer creates a host device for each logical unit exposed by a storage system in the host computer SAN. A host device is a logical entity in a host computer, through which a host computer may access a logical unit. In an embodiment of the present invention, host device 104 identifies LU A and generates a corresponding host device 140, designated as Device A, through which it can access LU A. Similarly, host computer 116 identifies LU B and generates a corresponding device 160, designated as Device B.

In an embodiment of the present invention, in the course of continuous operation, host computer 104 is a SAN initiator that issues I/O requests (write/read operations) through host device 140 to LU A using, for example, SCSI commands. Such requests are generally transmitted to LU A with an address that includes a specific device identifier, an offset within the device, and a data size. Offsets are generally aligned to 512 byte blocks. The average size of a write operation issued by host computer 104 may be, for example, 10 kilobytes (KB); i.e., 20 blocks. For an I/O rate of 50 megabytes (MB) per second, this corresponds to approximately 5,000 write transactions per second.

System 100 includes two data protection appliances, a source side DPA 112 and a target side DPA 124. A DPA performs various data protection services, such as data replication of a storage system, and journaling of I/O requests issued by a host computer to source side storage system data. As explained in detail hereinbelow, when acting as a target side DPA, a DPA may also enable rollback of data to an earlier point in time, and processing of rolled back data at the target site. Each DPA 112 and 124 is a computer that includes inter alia one or more conventional CPUs and internal memory.

For additional safety precaution, each DPA is a cluster of such computers. Use of a cluster ensures that if a DPA computer is down, then the DPA functionality switches over to another computer. The DPA computers within a DPA cluster communicate with one another using at least one communication link suitable for data transfer via fiber channel or IP based protocols, or such other transfer protocol. One computer from the DPA cluster serves as the DPA leader. The DPA cluster leader coordinates between the computers in the cluster, and may also perform other tasks that require coordination between the computers, such as load balancing.

In the architecture illustrated in FIG. 1, DPA 112 and DPA 124 are standalone devices integrated within a SAN. Alternatively, each of DPA 112 and DPA 124 may be integrated into storage system 108 and storage system 120, respectively, or integrated into host computer 104 and host computer 116, respectively. Both DPAs communicate with their respective host computers through communication lines such as fiber channels using, for example, SCSI commands.

In accordance with an embodiment of the present invention, DPAs 112 and 124 are configured to act as initiators in the SAN; i.e., they can issue I/O requests using, for example, SCSI commands, to access logical units on their respective storage systems. DPA 112 and DPA 124 are also configured with the necessary functionality to act as targets; i.e., to reply to I/O requests, such as SCSI commands, issued by other initiators in the SAN, including inter alia their respective host computers 104 and 116. Being target nodes, DPA 112 and DPA 124 may dynamically expose or remove one or more logical units.

As described hereinabove, Site I and Site II may each behave simultaneously as a production site and a backup site for different logical units. As such, DPA 112 and DPA 124 may each behave as a source DPA for some logical units, and as a target DPA for other logical units, at the same time.

In accordance with an embodiment of the present invention, host computer 104 and host computer 116 include protection agents 144 and 164, respectively. Protection agents 144 and 164 intercept SCSI commands issued by their respective host computers, via host devices to logical units that are accessible to the host computers. In accordance with an embodiment of the present invention, a data protection agent may act on an intercepted SCSI commands issued to a logical unit, in one of the following ways:

Send the SCSI commands to its intended logical unit;
Redirect the SCSI command to another logical unit;
Split the SCSI command by sending it first to the respective DPA. After the DPA returns an acknowledgement, send the SCSI command to its intended logical unit;
Fail a SCSI command by returning an error return code; and
Delay a SCSI command by not returning an acknowledgement to the respective host computer.

A protection agent may handle different SCSI commands, differently, according to the type of the command. For example, a SCSI command inquiring about the size of a certain logical unit may be sent directly to that logical unit, while a SCSI write command may be split and sent first to a DPA associated with the agent. A protection agent may also change its behavior for handling SCSI commands, for example as a result of an instruction received from the DPA.

Specifically, the behavior of a protection agent for a certain host device generally corresponds to the behavior of its associated DPA with respect to the logical unit of the host device. When a DPA behaves as a source site DPA for a certain logical unit, then during normal course of operation, the associated protection agent splits I/O requests issued by a host computer to the host device corresponding to that logical unit. Similarly, when a DPA behaves as a target device for a certain logical unit, then during normal course of operation, the associated protection agent fails I/O requests issued by host computer to the host device corresponding to that logical unit.

Communication between protection agents and their respective DPAs may use any protocol suitable for data transfer within a SAN, such as fiber channel, or SCSI over fiber channel. The communication may be direct, or via a logical unit exposed by the DPA. In an embodiment of the present invention, protection agents communicate with their respective DPAs by sending SCSI commands over fiber channel.

In an embodiment of the present invention, protection agents 144 and 164 are drivers located in their respective host computers 104 and 116. Alternatively, a protection agent may also be located in a fiber channel switch, or in any other device situated in a data path between a host computer and a storage system.

What follows is a detailed description of system behavior under normal production mode, and under recovery mode.

In accordance with an embodiment of the present invention, in production mode DPA 112 acts as a source site DPA for LU A. Thus, protection agent 144 is configured to act as a source side protection agent; i.e., as a splitter for host device A. Specifically, protection agent 144 replicates SCSI I/O requests. A replicated SCSI I/O request is sent to DPA 112. After receiving an acknowledgement from DPA 124, protection agent 144 then sends the SCSI I/O request to LU A. Only after receiving a second acknowledgement from storage system 108 will host computer 104 initiate another I/O request.

When DPA 112 receives a replicated SCSI write request from data protection agent 144, DPA 112 transmits certain I/O information characterizing the write request, packaged as a "write transaction", over WAN 128 to DPA 124 on the target side, for journaling and for incorporation within target storage system 120.

DPA 112 may send its write transactions to DPA 124 using a variety of modes of transmission, including inter alia (i) a synchronous mode, (ii) an asynchronous mode, and (iii) a snapshot mode. In synchronous mode, DPA 112 sends each write transaction to DPA 124, receives back an acknowledgement from DPA 124, and in turns sends an acknowledgement back to protection agent 144. Protection agent 144 waits until receipt of such acknowledgement before sending the SCSI write request to LU A.

In asynchronous mode, DPA 112 sends an acknowledgement to protection agent 144 upon receipt of each I/O request, before receiving an acknowledgement back from DPA 124.

In snapshot mode, DPA 112 receives several I/O requests and combines them into an aggregate "snapshot" of all write activity performed in the multiple I/O requests, and sends the snapshot to DPA 124, for journaling and for incorporation in target storage system 120. In snapshot mode DPA 112 also sends an acknowledgement to protection agent 144 upon receipt of each I/O request, before receiving an acknowledgement back from DPA 124.

For the sake of clarity, the ensuing discussion assumes that information is transmitted at write-by-write granularity.

While in production mode, DPA 124 receives replicated data of LU A from DPA 112, and performs journaling and writing to storage system 120. When applying write operations to storage system 120, DPA 124 acts as an initiator, and sends SCSI commands to LU B.

During a recovery mode, DPA 124 undoes the write transactions in the journal, so as to restore storage system 120 to the state it was at, at an earlier time.

As described hereinabove, in accordance with an embodiment of the present invention, LU B is used as a backup of LU A. As such, during normal production mode, while data written to LU A by host computer 104 is replicated from LU A to LU B, host computer 116 should not be sending I/O requests to LU B. To prevent such I/O requests from being sent, protection agent 164 acts as a target site protection agent for host Device B and fails I/O requests sent from host computer 116 to LU B through host Device B.

In accordance with an embodiment of the present invention, target storage system 120 exposes a logical unit 176, referred to as a "journal LU", for maintaining a history of write transactions made to LU B, referred to as a "journal". Alternatively, journal LU 176 may be striped over several logical units, or may reside within all of or a portion of another logical unit. DPA 124 includes a journal processor 180 for managing the journal.

Journal processor 180 functions generally to manage the journal entries of LU B. Specifically, journal processor 180 (i) enters write transactions received by DPA 124 from DPA 112 into the journal, by writing them into the journal LU, (ii) applies the journal transactions to LU B, and (iii) updates the journal entries in the journal LU with undo information and removes already-applied transactions from the journal. As described below, with reference to FIGS. 2 and 3A-3D, journal entries include four streams, two of which are written when write transaction are entered into the journal, and two of which are written when write transaction are applied and removed from the journal.

Figure 2:
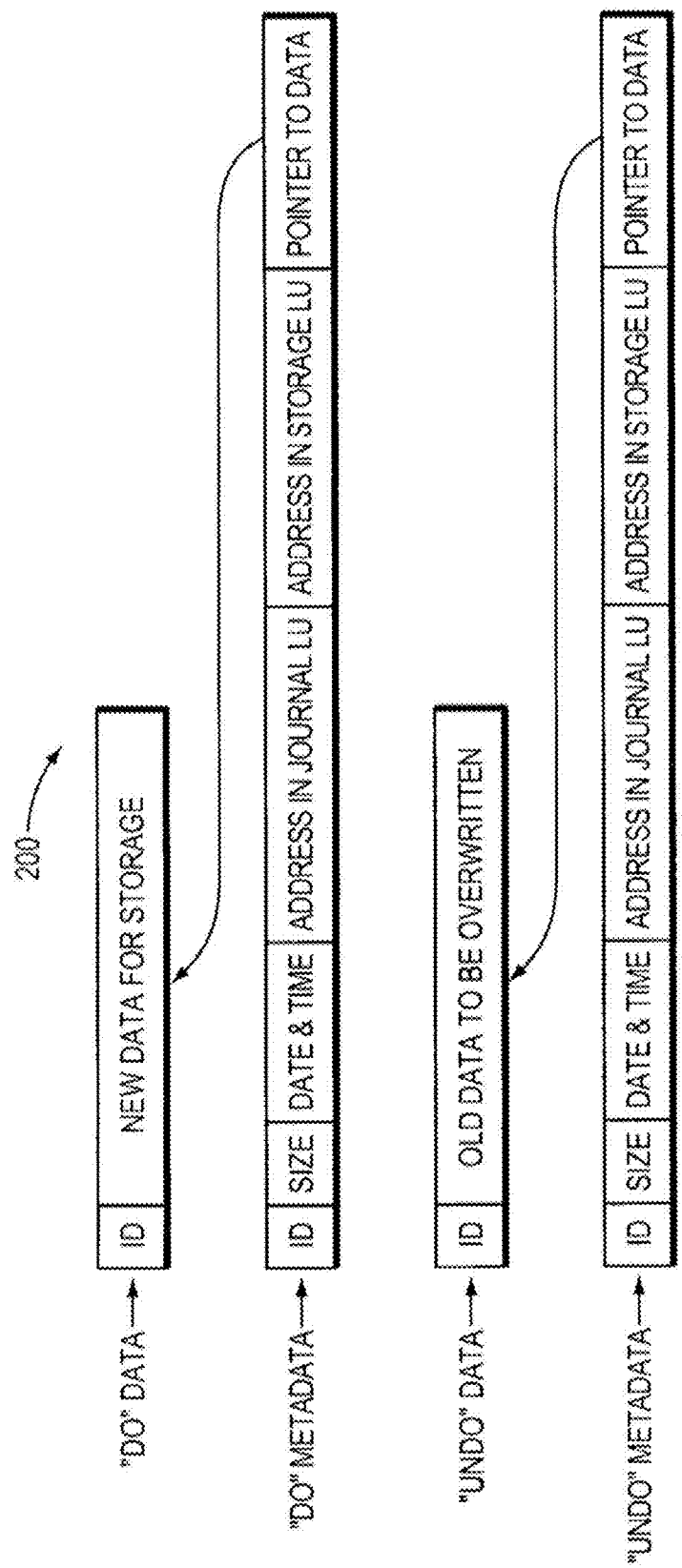
FIG. 2 is a block diagram of a write transaction for a journal according to an example embodiment of the present invention.

FIG. 2 is a simplified illustration of a write transaction 200 for a journal, in accordance with an embodiment of the present invention. The journal may be used to provide an adaptor for access to storage 120 at the state it was in at any specified point in time. Since the journal contains the "undo" information necessary to rollback storage system 120, data that was stored in specific memory locations at the specified point in time may be obtained by undoing write transactions that occurred subsequent to such point in time.

Write transaction 200 generally includes the following fields:
  one or more identifiers;
  a time stamp, which is the date & time at which the transaction was received by source side DPA 112;
  a write size, which is the size of the data block;
  a location in journal LU 176 where the data is entered;
  a location in LU B where the data is to be written; and
  the data itself.

Write transaction 200 is transmitted from source side DPA 112 to target side DPA 124. As shown in FIG. 2, DPA 124 records the write transaction 200 in four streams. A first stream, referred to as a DO stream, includes new data for writing in LU B. A second stream, referred to as an DO METADATA stream, includes metadata for the write transaction, such as an identifier, a date & time, a write size, a beginning address in LU B for writing the new data in, and a pointer to the offset in the do stream where the corresponding data is located. Similarly, a third stream, referred to as an UNDO stream, includes old data that was overwritten in LU B; and a fourth stream, referred to as an UNDO METADATA, include an identifier, a date & time, a write size, a beginning address in LU B where data was to be overwritten, and a pointer to the offset in the undo stream where the corresponding old data is located.

In practice each of the four streams holds a plurality of write transaction data. As write transactions are received dynamically by target DPA 124, they are recorded at the end of the DO stream and the end of the DO METADATA stream, prior to committing the transaction. During transaction application, when the various write transactions are applied to LU B, prior to writing the new DO data into addresses within the storage system, the older data currently located in such addresses is recorded into the UNDO stream.

By recording old data, a journal entry can be used to "undo" a write transaction. To undo a transaction, old data is read from the UNDO stream in a reverse order, from the most recent data to the oldest data, for writing into addresses within LU B. Prior to writing the UNDO data into these addresses, the newer data residing in such addresses is recorded in the DO stream.

The journal LU is partitioned into segments with a pre-defined size, such as 1 MB segments, with each segment identified by a counter. The collection of such segments forms a segment pool for the four journaling streams described hereinabove. Each such stream is structured as an ordered list of segments, into which the stream data is written, and includes two pointers—a beginning pointer that points to the first segment in the list and an end pointer that points to the last segment in the list.

According to a write direction for each stream, write transaction data is appended to the stream either at the end, for a forward direction, or at the beginning, for a backward direction. As each write transaction is received by DPA 124, its size is checked to determine if it can fit within available segments. If not, then one or more segments are chosen from the segment pool and appended to the stream's ordered list of segments.

Thereafter the DO data is written into the DO stream, and the pointer to the appropriate first or last segment is updated. Freeing of segments in the ordered list is performed by simply changing the beginning or the end pointer. Freed segments are returned to the segment pool for re-use.

A journal may be made of any number of streams including less than or more than 5 streams. Often, based on the speed of the journaling and whether the back-up is synchronous or a synchronous a fewer or greater number of streams may be used.

Image Access

Herein, some information is provided for conventional continuous data protection systems having journaling and a replication splitter which may be used in one or more embodiments is provided. A replication may set refer to an association created between the source volume and the local and/or remote target volumes, and a consistency group contains one or more replication sets. A snapshot may be the difference between one consistent image of stored data and the next. The exact time for closing the snapshot may determined dynamically depending on replication policies and the journal of the consistency group.

In synchronous replication, each write may be a snapshot. When the snapshot is distributed to a replica, it may be stored in the journal volume, so that is it possible to revert to previous images by using the stored snapshots. As noted above, a splitter mirrors may write from an application server to LUNs being protected by the data protection appliance. When a write is requested from the application server it may be split and sent to the appliance using a host splitter/driver (residing in the I/O stack, below any file system and volume manager, and just above any multipath driver (such as EMC™ PowerPath™), through an intelligent fabric switch, through array-based splitter, such as EMC CLARiiON®.

There may be a number of image access modes. Image access may be used to restore production from the disaster recovery site, and to roll back to a previous state of the data. Image access may be also to temporarily operate systems from a replicated copy while maintenance work is carried out on the production site and to fail over to the replica. When image access is enabled, host applications at the copy site may be able to access the replica.

In virtual access, the system may create the image selected in a separate virtual LUN within the data protection appliance. While performance may be constrained by the appliance, access to the point-in-time image may be nearly instantaneous. The image may be used in the same way as logged access (physical), noting that data changes are temporary and stored in the local journal. Generally, this type of image access is chosen because the user may not be sure which image, or point in time is needed. The user may access several images to conduct forensics and determine which replica is required. Note that in known systems, one cannot recover the production site from a virtual image since the virtual image is temporary. Generally, when analysis on the virtual image is completed, the choice is made to disable image access.

If it is determined the image should be maintained, then access may be changed to logged access using 'roll to image.' When disable image access is disabled, the virtual LUN and all writes to it may be discarded.

In an embodiment of virtual access with roll image in background, the system first creates the image in a virtual volume managed by the data protection appliance to provide rapid access to the image, the same as in virtual access. Simultaneously in background, the system may roll to the physical image. Once the system has completed this action, the virtual volume may be discarded, and the physical volume may take its place. At this point, the system continues to function as if logged image access was initially selected. The switch from virtual to physical may be transparent to the servers and applications and the user may not see any difference in access. Once this occurs, changes may be read from the physical volume instead of being performed by the appliance. If image access is disabled, the writes to the volume while image access was enabled may be rolled back (undone). Then distribution to storage may continue from the accessed image forward.

In some embodiments in physical logged access, the system rolls backward (or forward) to the selected snapshot (point in time). There may be a delay while the successive snapshots are applied to the replica image to create the selected image. The length of delay may depend on how far the selected snapshot is from the snapshot currently being distributed to storage. Once the access is enabled, hosts may read data directly from the volume and writes may be handled through the DPA. The host may read the undo data of the write and the appliance may store the undo data in a logged access journal. During logged access the distribution of snapshots from the journal to storage may be paused. When image access is disabled, writes to the volume while image access was enabled (tracked in the logged access journal) may be rolled back (undone). Then distribution to storage may continue from the accessed snapshot forward.

Disable image access may mean changes to the replica may be discarded or thrown away. It may not matter what type of access was initiated, that is, logged or another type, or whether the image chosen was the latest or an image back in time. Disable image access effectively says the work done at the disaster recovery site is no longer needed.

Delta Marking

A delta marker stream may contain the locations that may be different between the latest I/O data which arrived to the remote side (the current remote site) and the latest I/O data which arrived at the local side. In particular, the delta marking stream may include metadata of the differences between the source side and the target side. For example, every I/O reaching the data protection appliance for the source 112 may be written to the delta marking stream and data is freed from the delta marking stream when the data safely arrives at both the source volume of replication 108 and the remote journal 180 (e.g. DO stream). Specifically, during an initialization process no data may be freed from the delta marking stream; and only when the initialization process is completed and I/O data has arrived to both local storage and the remote journal data, may be I/O data from the delta marking stream freed. When the source and target are not synchronized, data may not be freed from the delta marking stream. The initialization process may start by merging delta marking streams of the target and the source so that the delta marking stream includes a list of all different locations between local and remote sites. For example, a delta marking stream at the target might have data too if a user has accessed an image at the target site.

The initialization process may create one virtual disk out of all the available user volumes. The virtual space may be divided into a selected number of portions depending upon the amount of data needed to be synchronized. A list of 'dirty' blocks may be read from the delta marker stream that is relevant to the area currently being synchronized to enable creation of a dirty location data structure. The system may begin synchronizing units of data, where a unit of data is a constant amount of dirty data, e.g., a data that needs to be synchronized.

The dirty location data structure may provide a list of dirty location until the amount of dirty location is equal to the unit size or until there is no data left. The system may begin a so-called ping pong process to synchronize the data. The process may transfer the differences between the production and replica site to the replica.

A discussion of mirroring may be found in U.S. Pat. No. 7,346,805 entitled "PROTECTION OF MIRRORED DATA" issued on Mar. 18, 2008, a discussion of journaling and some techniques associated with journaling may be found in U.S. Pat. No. 7,516,287 entitled "METHODS AND APPARATUS FOR OPTIMAL JOURNALING FOR CONTINUOUS DATA REPLICATION" issued on Apr. 7, 2009, and a discussion of dynamically adding storage for a journal may be found in U.S. Pat. No. 7,840,536 entitled "METHODS AND APPARATUS FOR DYNAMIC JOURNAL EXPANSION" issued on Nov. 23, 2010, all of which are assigned to EMC Corporation of Hopkinton, Mass. and are hereby incorporated by reference in their entirety.

Managing Changed Block Tracking and Continuous Data Protection Replication

Traditional methods of transitioning from continuous data protection (CDP) to changed block tracking (CBT) required splitting the data to get the snapshot shipping changes. However, in example embodiments of the present invention, the response time of the production site storage array writes will be lower due to not having to split the data. Further, it would be desirable to be able to transition between data protection technologies (e.g., CDP to CBT and CBT to CDP). Accordingly, example embodiments of the present invention overcome these and other deficiencies by providing a method, a system, and a computer program product for managing data protection technologies, including CDP and CBT.

Certain replication technologies, such as EMC RecoverPoint® by EMC Corporation of Hopkinton, Mass., support both continuous data protection (CDP), snapshot shipping-based replication, and/or changed block tracking (CBT). In EMC RecoverPoint, for example, the replication system may automatically transition from CDP, supporting any point in time recovery, to snapshot-based replication where every period of time the replication system creates a snapshot at the storage array, or hypervisor in virtual environments, and ships to the replication site the differences between a current snapshot and a previously shipped snapshot. In CBT, a list of blocks changed between two snapshots is generated and only the changed blocks will be shipped to the replication site. A CBT facility may maintain one or more CBT bitmaps (e.g., in storage or, in the case of a virtual machine, in a hypervisor). In one embodiment, bitmap entries of 1 indicate that the corresponding blocks have been written to, while bitmap entries of 0 indicate that the corresponding blocks have not been written to. I/O operations may be captured by the CBT facility 335 and translated into block level I/O operations. The CBT facility may examine the block level I/O operations and set the bit values of bitmap entries corresponding to any of the blocks that are being written to.

In example embodiments of the present invention, the replication environment includes a splitter $320_1$ installed in the data path between a host $305_1$ and the storage $315_1$. In a preferred embodiment, the splitter $320_1$ intercepts I/Os arriving to the replicated device (i.e., volume $330_1$) and sends the split I/O to the original target (i.e., volume $330_1$) and the production site DPA $340_1$. The production site DPA $340_1$ then may send the I/O directly to the replication site DPA $340_2$, thus supporting CDP. In other embodiments, the production site DPA $340_1$ may create a snapshot on the production site storage $315_1$ and use the split I/Os tracked in the delta marking stream of the production site DPA $340_1$ for tracking changes between snapshots. In other words, in snapshot shipping mode, the production site DPA $340_1$ tracks the changes of the arriving I/Os, creates a snapshot of the production site storage $315_1$, and then reads the changes based on the changes tracked in the delta marking stream of the production site DPA $340_1$.

It should be understood that some storage arrays and hypervisors include a CBT facility 335 which may be used to provide differences between two snapshots. Thus, snapshot shipping modes can be supported by shipping a first snapshot, creating a second snapshot, using the CBT facility to read the differences between the first and second snapshots, and then shipping the second snapshot to the replication site DPA $340_2$. In certain embodiments, using a CBT facility to ship snapshots may be more efficient than performing CDP (or even splitting only meta data of the I/Os to the production site DPA $340_1$) because of latency associated with forwarding the I/O out of the production site storage $315_1$. However, in other embodiments, CDP may be more efficient because CDP provides a much lower recovery point objective (RPO) and the replicated points in time typically are much closer to a current point in time (and may even be synchronous). In snapshot shipping with CBT, on the other hand, the replication site receives a point in time only periodically (e.g., every 15 or 30 minutes); however, if a lot of changes were made in a small period of time, CBT may be more efficient than CDP because of a lower bandwidth requirement for shipping snapshots.

Accordingly, example embodiments of the present invention may ship CBT bitmaps to the replication site instead of tracking the changes via CDP in the production site DPA $340_1$ after the replication environment 300 has transitioned from CDP to snapshot shipping.

Figure 3:
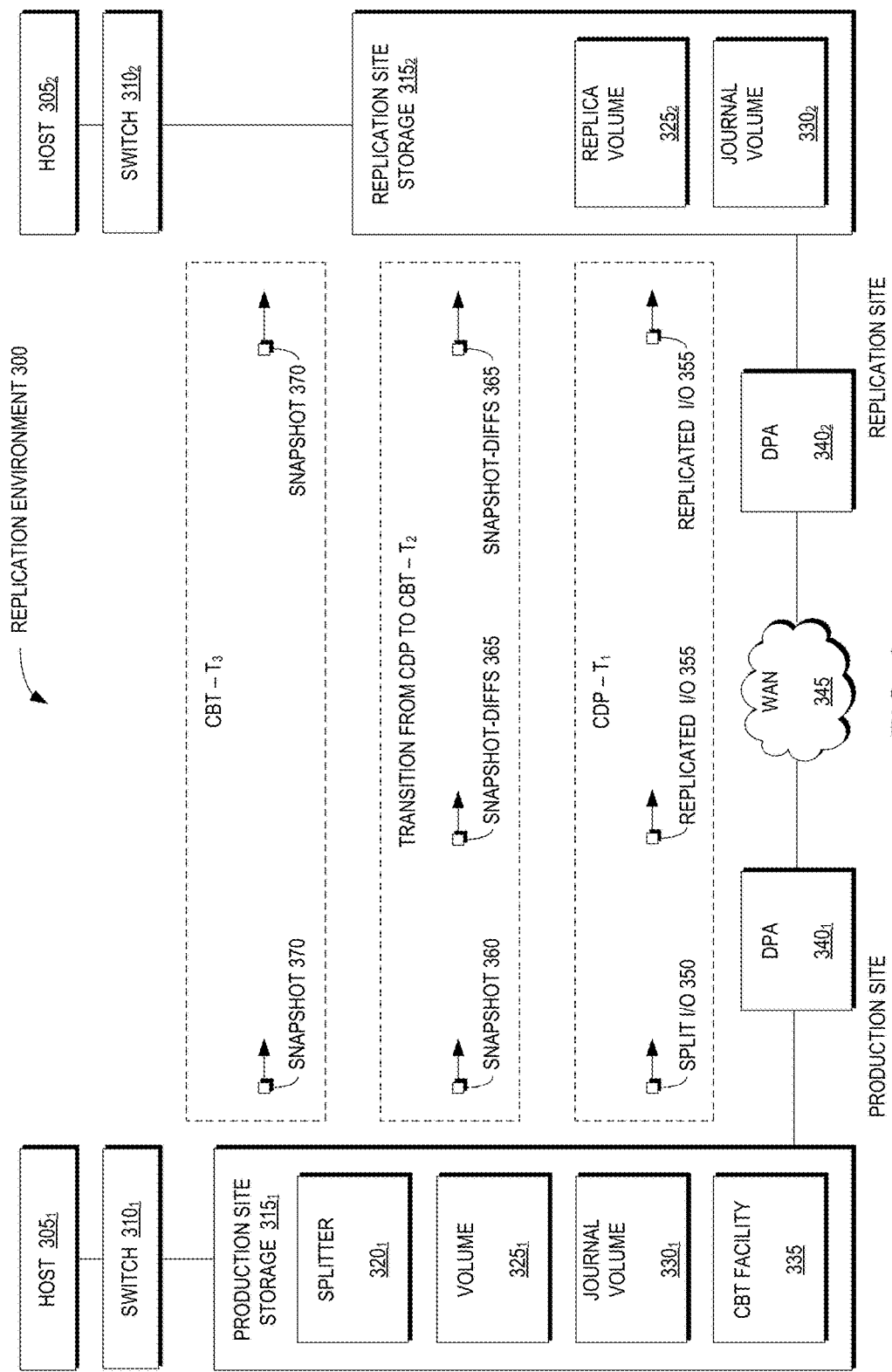
FIG. 3 is a block diagram of a data protection environment illustrating a transitioning replication technologies from continuous data protection to changed block tracking according to an example embodiment of the present invention.

FIG. 3 is a block diagram of a data protection environment 300 illustrating transitioning replication technologies from CDP to CBT according to an example embodiment of the present invention. As illustrated in FIG. 3, the data protection environment 300 includes a production site and a replication site connected via a WAN 345. The production site may include a host $305_1$, a switch $310_1$ providing connectivity to production site storage $315_1$, and a production site data protection appliance (DPA) $340_1$. In certain embodiments, the production site storage $315_1$ may include a splitter $320_1$, a storage volume $325_1$, and a journal volume $330_1$. In certain embodiments, as illustrated in FIG. 3, the production site storage $315_1$ also may include a CBT facility 335 (e.g., EMC VNX® or EMC XtremIO®). Although CBT is usually done in a storage system which provides the difference between two snapshots in the storage system, in other embodiments, the CBT facility 335 may be included in the host $305_1$ (e.g., VMware vSphere® Virtual Machine File System (VMFS)). The replication site also may include a host $305_2$, a switch $310_2$ providing connectivity to replication site storage $315_2$, which may have a replica volume $325_2$ and a journal volume $330_2$, and a replication site DPA $340_2$.

Figure 4:
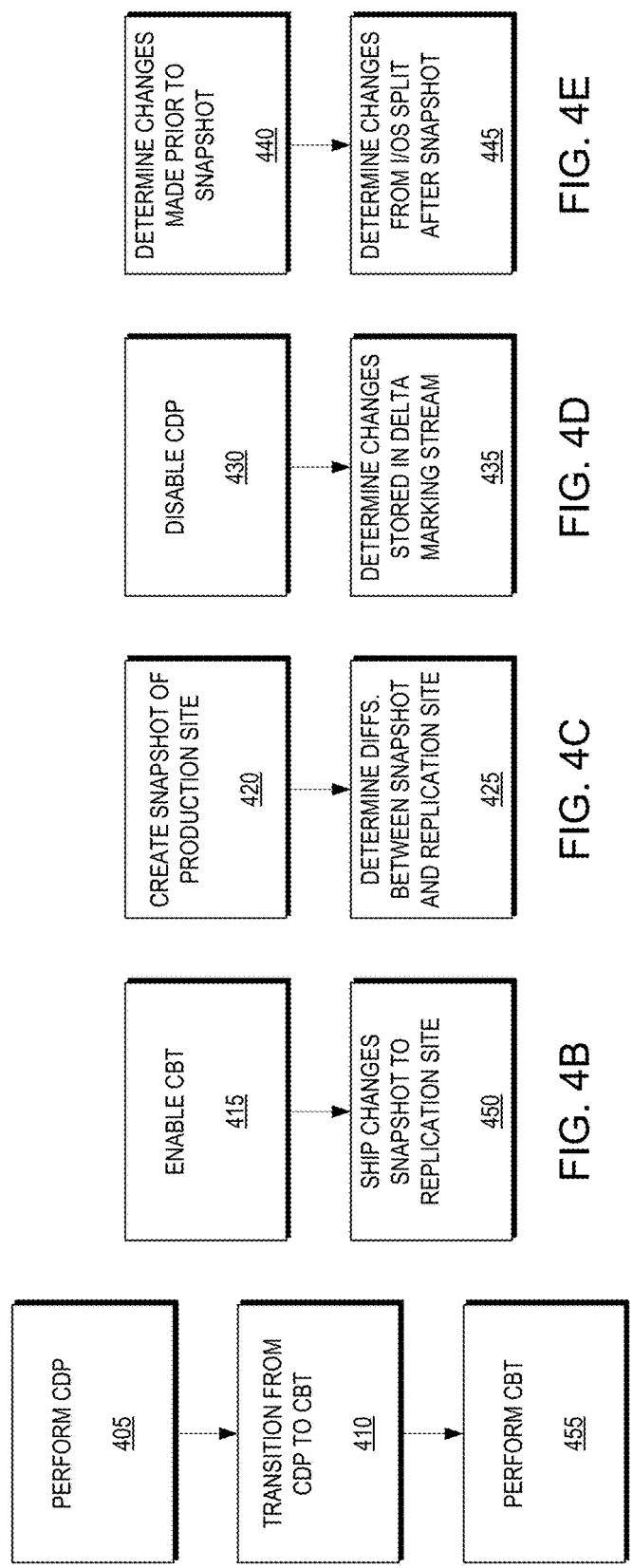
FIGS. 4A-4E are flow diagrams illustrating methods for transitioning replication technologies from continuous data protection to changed block tracking according to respective example embodiments of the present invention.

FIG. 3 may be described in conjunction with FIGS. 4A-4E which are flow diagrams illustrating methods for transitioning replication technologies from CDP to CBT according to respective example embodiments of the present invention. As illustrated in FIGS. 3 and 4A, at time $T_1$ the production site DPA $340_1$ may perform CDP in the data protection environment 300 (405). As described above, the splitter $320_1$ may split I/Os received from the host $305_1$ and forward the split I/O 350 to both the production site storage volume $325_1$ and the production site DPA $340_1$. The production site DPA $340_1$ then may replicate the split I/O 350 as a replicated I/O 355 and forward the replicated I/O 355 over the WAN 345 to the replication site DPA $340_2$ for replication to the replica volume $325_2$ at the replication site storage $315_2$. At time $T_2$ the production site DPA $340_1$ may transition from CDP to CBT in the data protection environment 300 (410). From time $T_3$, the CBT facility 335 then may perform CBT in the data protection environment 300 (460) by shipping a snapshot 370 to the replication site DPA $340_2$.

As illustrated in FIGS. 3 and 4B, to transition from CDP to CBT at time $T_2$, the CBT facility 335 may enable CBT in the data protection environment 300 (415) and ship a changes snapshot 365 to the replication site DPA $340_2$ in the data protection environment 300 based on changes tracked in the production site DPA $340_1$ in the data protection environment 300 (450). As illustrated in FIGS. 3 and 4C, to ship the changes snapshot 365 to the replication site DPA $340_2$ in the data protection environment 300, the production site storage $315_1$ may create a snapshot 360 of the production site storage in the data protection environment 300 (420). The production site DPA $340_1$ then may determine differences between the snapshot 360 of the production site and a state of the replication site (425).

As illustrated in FIGS. 3 and 4D, in order to determine the differences between the snapshot 360 of the production site and the state of the replication site (425), the production site DPA 340₁ may continue to perform CDP prior to enabling CBT in the data protection environment 300. The splitter 320₁ then may stop splitting I/Os (i.e., disable CDP) to the production site DPA 340₁ after the production site storage 315₁ creates the snapshot 360 of the production site in the data protection environment 300 (430). The production site DPA 340₁ then may determine the differences between the snapshot 360 of the production site and the state of the replication site by examining changes stored in the delta marking stream of the production site DPA 340₁ in the data protection environment 300.

As illustrated in FIGS. 3 and 4E, to determine changes stored in the delta marking stream of the production site DPA 340₁, the production site DPA 340₁ may determine a first set of changes in the delta marking stream made prior to creation of the snapshot 360 of the production site in the data protection environment 300 (440) and determine a second set of changes in the delta marking stream from I/Os split to the production site DPA 340₁ after creation of the snapshot 360 of the production site in the data protection environment 300 (445).

Figure 5:
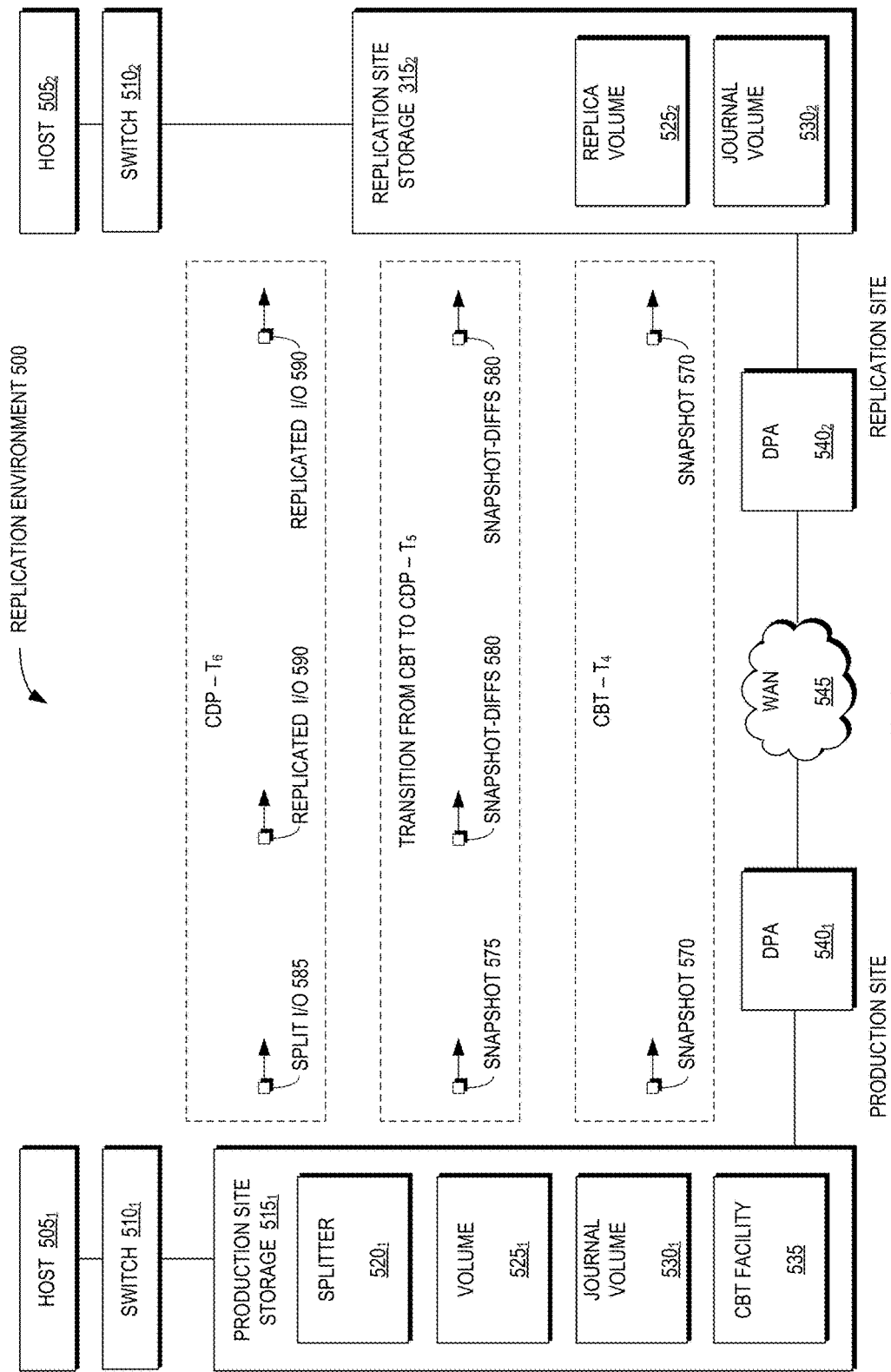
FIG. 5 is a block diagram of a data protection environment illustrating a transitioning replication technologies from changed block tracking to continuous data protection according to an example embodiment of the present invention.

FIG. 5 is a block diagram of a data protection environment 500 illustrating transitioning replication technologies from CBT to CDP according to an example embodiment of the present invention. As illustrated in FIG. 5, the data protection environment 500 includes a production site and a replication site connected via a WAN 545. The production site may include a host 505₁, a switch 510₁ providing connectivity to production site storage 515₁, and a production site DPA 540₁. In certain embodiments, the production site storage 515₁ may include a splitter 520₁, a storage volume 525₁, and a journal volume 530₁. In certain embodiments, as illustrated in FIG. 5, the production site storage 515₁ also may include a CBT facility 535. In other embodiments, the CBT facility 535 may be included in the host 505₁. The replication site also may include a host 505₂, a switch 510₂ providing connectivity to replication site storage 515₂, which may have a replica volume 525₂ and a journal volume 530₂, and a replication site DPA 540₂.

Figure 6A:
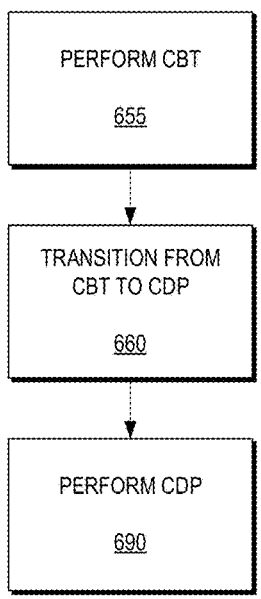
FIGS. 6A-6C are flow diagrams illustrating methods for transitioning replication technologies from changed block tracking to continuous data protection according to respective example embodiments of the present invention.
Figure 6B:
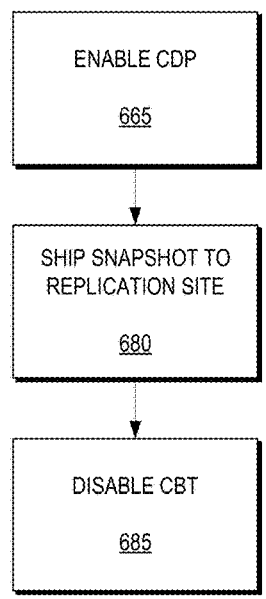
Figure 6C:
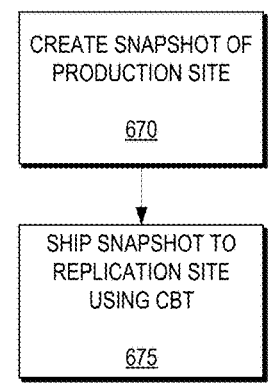

FIG. 5 may be described in conjunction with FIGS. 6A-6C which are flow diagrams illustrating methods for transitioning replication technologies from CBT to CDP according respective an example embodiments of the present invention. As illustrated in FIGS. 5 and 6A, at time T₄ the CBT facility 535 may perform CBT in the data protection environment 500 (660) by shipping a snapshot 570 to the replication site DPA 540₂. At time T5 the production site DPA 5401 may transition from CBT to CDP in the data protection environment 500 (665). From time T6 the production site DPA 540₁ may perform CDP in the data protection environment 500 (695). As described above, the splitter 520₁ may split I/Os received from the host 505₁ and forward the split I/O 585 to both the production site storage volume 525₁ and the production site DPA 540₁. The production site DPA 540₁ then may replicate the split I/O 585 as a replicated I/O 590 and forward the replicated I/O 590 over the WAN 545 to the replication site DPA 540₂ for replication to the replica volume 525₂ at the replication site storage 515₂.

As illustrated in FIGS. 5 and 6B, to transition from CBT to CDP at time T5, the production site DPA 540₁ may enable CDP in the data protection environment 500 (670). The CBT facility 535 then may ship a snapshot 575 of the production site storage 515l in the data protection environment 500 to the replication site in the data protection environment 500 (685). The CBT facility 535 then may disable CBT in the data protection environment (690).

As illustrated in FIGS. 5 and 6C, to ship the snapshot 575 of the production site storage 515₁ in the data protection environment 500 to the replication site in the data protection environment 500, the CBT facility 535 may create the snapshot 575 of the production site storage 515₁ (675) and then ship the snapshot 575 of the production site storage 515₁ to the replication site using CBT (680). Therefore, after the last snapshot is shipped, the production site may operate using CDP.

In certain embodiments, the DPA 340₁, 540₁ may monitor data protection performance in the data protection environment and determine a first state of data protection performance according to a first data protection technology and determine that data protection performance would be improved for the data protection environment by transitioning to a second data protection technology. For example, at times the data protection environment is operating according to CDP, the DPA 340₁ may monitor the data protection performance of CDP data protection and determine that the data protection performance of the data protection environment would be improved by transitioning from CDP to CBT. Similarly, at times the data protection environment is operating according to CBT, the DPA 540₁ may monitor the data protection performance of CBT data protection and determine that the data protection performance of the data protection environment would be improved by transitioning from CBT to CDP.

FIGS. 7A and 7B are flow diagrams illustrating methods for transitioning replication technologies from continuous data protection to changed block tracking and transitioning replication technologies from changed block tracking to continuous data protection, respectively, according to respective example embodiments of the present invention. FIGS. 7A and 7B may be described in conjunction with FIG. 8 which is a flow diagram illustrating a method of transitioning replication technologies from continuous data protection to changed block tracking and back to continuous data protection according to an example embodiment of the present invention.

Figure 8:
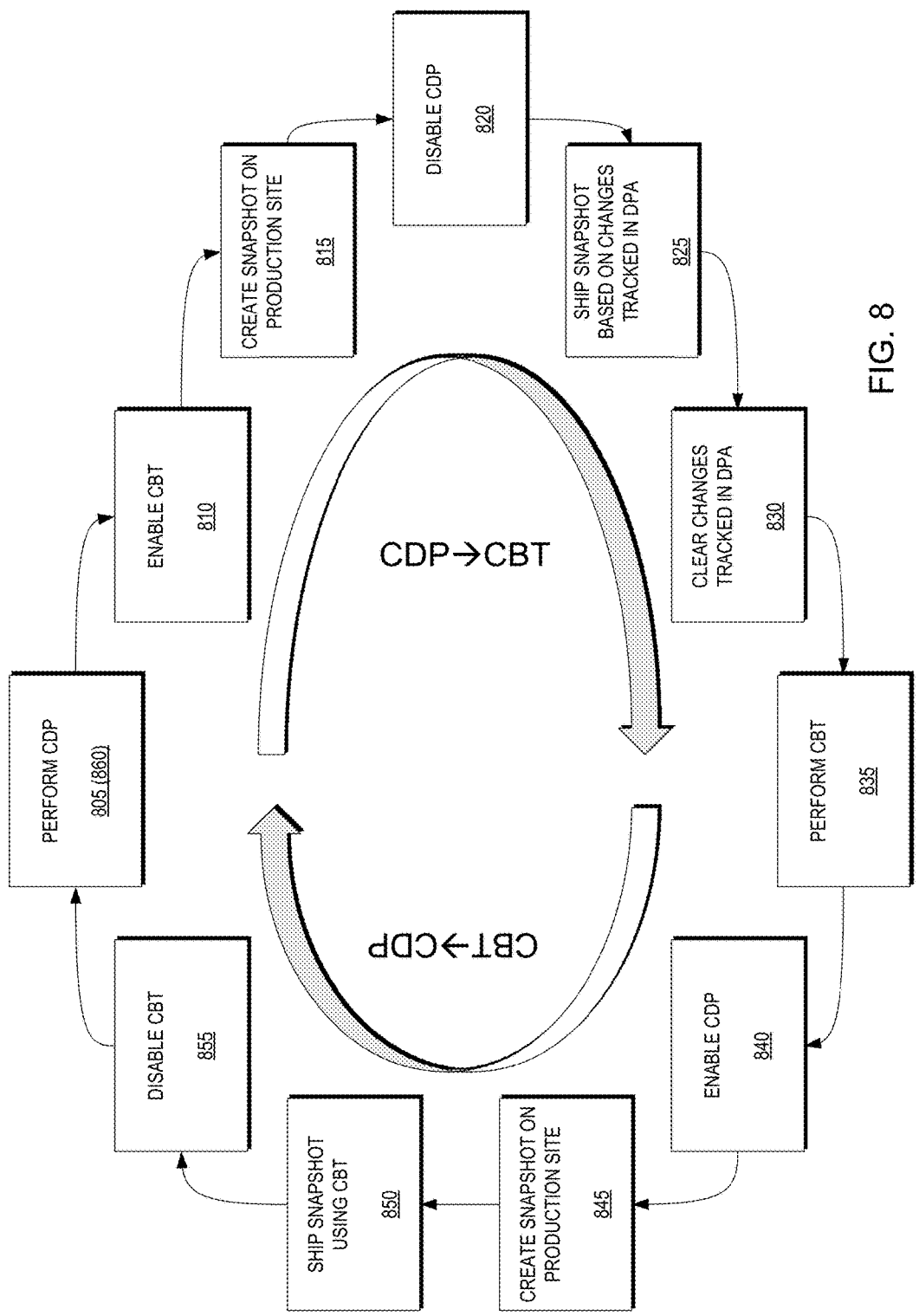
FIG. 8 is a flow diagram illustrating a method of transitioning replication technologies from continuous data protection to changed block tracking and back to continuous data protection according to an example embodiment of the present invention.

FIGS. 7A and 8 also may be described in conjunction with FIG. 3. As illustrated in FIGS. 3, 7A, and 8, at time T₁ the production site DPA 340₁ may perform CDP in the data protection environment 300 (705, 805). Between time T1 and time T2, the CBT facility 355 may enable CBT in the data protection environment 300 (710, 810). At time T₂ the production site DPA 340₁ may transition from CDP to CBT in the data protection environment 300 by creating a snapshot 360 of the production site storage in the data protection environment 300 (715, 815); however, during this time the splitter 320₁ continues to split I/Os from the host 505₁. Between time T2 and time T3 the production site DPA 340₁ then may disable CDP in the data protection environment 300 (720, 820) after the CBT facility 355 creates the snapshot 360 of the production site storage in the data protection environment 300. Thus, the production site DPA 340₁ has a record of all the differences between the production site and the replication site.

The CBT facility 355 then may ship a snapshot 360 to the production site DPA 340₁ in the data protection environment 300. The production site DPA 340₁ then may create a changes snapshot 365 based on the snapshot 360 from the CBT facility 335 and changes tracked in the production site DPA 340₁ in the data protection environment 300 (725, 825). The difference for the changes snapshot 365 is kept because the snapshot 360 was taken while I/Os were still being split by the splitter 520₁; therefore, difference between the snapshot 360 and the replication site storage 315₂ is kept in a delta marking stream on the production site DPA $340_1$. The production site DPA $340_1$ then may clear the changes tracked in the production site DPA $340_1$ (730, 830). From time $T_3$, the CBT facility 335 then may perform CBT in the data protection environment 300 (735A, 835) by shipping a snapshot 370 to the replication site DPA $340_2$.

FIGS. 7B and 8 also may be described in conjunction with FIG. 5. As illustrated in FIGS. 3, 7B, and 8, at time $T_4$ the CBT facility 535 may continue to perform CBT in the data protection environment 500 (735B, 835) by shipping a snapshot 570 to the replication site DPA $540_2$. At time T5 the production site DPA $540_1$ may transition from CBT to CDP in the data protection environment 500 by enabling CDP in the data protection environment 500 (740, 840) (i.e., the splitter $520_1$ may start splitting I/Os from the host 5051 and the production site DPA $540_1$ may start tracking changes in its journal). The CBT facility 535 then may create a snapshot 575 of the production site storage 5151 (745, 845) and ship the snapshot 575 of the production site storage 5151 to the replication site using CBT (750, 850). Once the snapshot 575 is at the replication site of the data protection environment 500, the replication site DPA $540s$ has a record of all the differences between the production site and the replication site. Therefore, between time T5 and time T6 the CBT facility 535 may disable CBT in the data protection environment (755, 855) and, from time T6, the production site DPA $540_1$ may perform CDP in the data protection environment 500 (760, 860).

Figure 9:
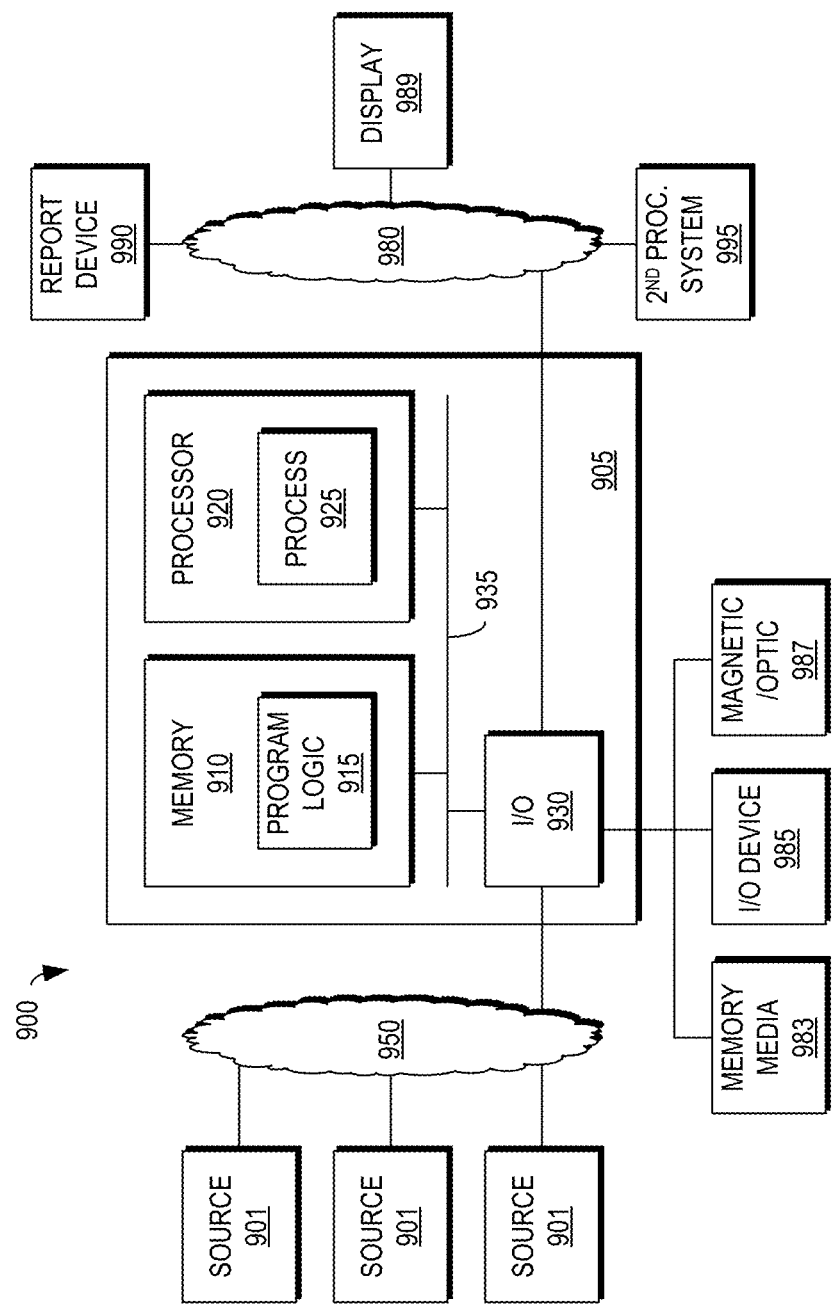
FIG. 9 is a block diagram of an apparatus according to example embodiment of the present invention.

FIG. 9 is a block diagram of an example embodiment apparatus 905 according to the present invention. The apparatus 905 may be part of a system 900 and includes memory 910 storing program logic 915, a processor 920 for executing a process 925, and a communications I/O interface 930, connected via a bus 935.

Processing may be implemented in hardware, software, or a combination of the two. Processing may be implemented in computer programs executed on programmable computers/machines that each includes a processor, a storage medium or other article of manufacture that is readable by the processor (including volatile and non-volatile memory and/or storage elements), at least one input device, and one or more output devices. Program code may be applied to data entered using an input device to perform processing and to generate output information.

The methods and apparatus of this invention may take the form, at least partially, of program code (i.e., instructions) embodied in tangible non-transitory media, such as floppy diskettes, CD-ROMs, hard drives, random access or read only-memory, or any other machine-readable storage medium. When the program code is loaded into and executed by a machine, such as the computer of FIG. 9, the machine becomes an apparatus for practicing the invention. When implemented on one or more general-purpose processors, the program code combines with such a processor to provide a unique apparatus that operates analogously to specific logic circuits. As such, a general purpose digital machine can be transformed into a special purpose digital machine.

Figure 10:
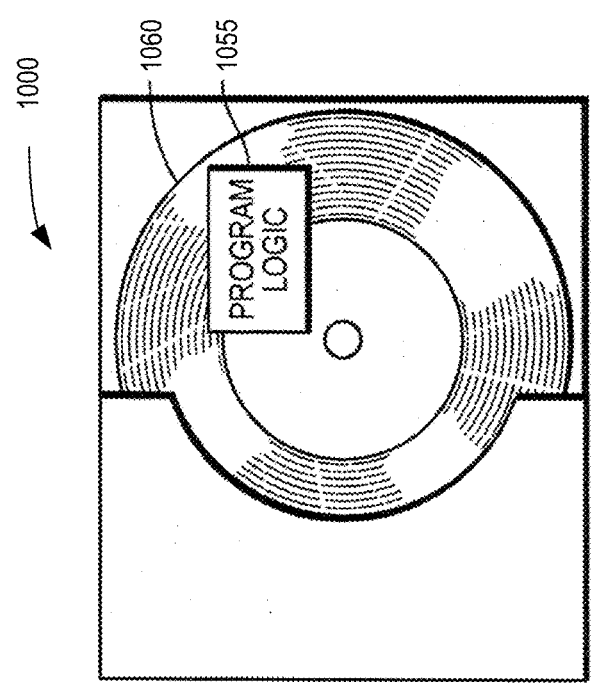
FIG. 10 is an illustration of computer program code according to an example embodiment of the present invention.

FIG. 10 is a block diagram of a computer program product 1000 including program logic 1055, encoded on a computer-readable medium 1060 in computer-executable code configured for carrying out the methods of the invention, according to an example embodiment of the present invention. The logic for carrying out the method may be embodied as part of the aforementioned system, which is useful for carrying out a method described with reference to embodiments shown.

Although the foregoing invention has been described in some detail for purposes of clarity of understanding, it will be apparent that certain changes and modifications may be practiced within the scope of the appended claims. The scope of the invention is limited only by the claims and the invention encompasses numerous alternatives, modifications, and equivalents. Numerous specific details are set forth in the above description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured. Accordingly, the above implementations are to be considered as illustrative and not restrictive, and the invention is not to be limited to the details given herein, but may be modified within the scope and equivalents of the appended claims.

What is claimed is:

1. A method comprising:
    performing, by a source side host, continuous data protection replication to replicate data to one or more target side hosts in a data protection environment;
    transitioning, by the source side host, from the continuous data protection replication to changed block tracking replication in the data protection environment; and
    performing, by the source side host, the changed block tracking replication to replicate the data to the one or more target side hosts in the data protection environment.

2. The method of claim 1 wherein transitioning from the continuous data protection replication to the changed block tracking replication in the data protection environment comprises:
    enabling the changed block tracking replication in the data protection environment; and
    shipping a changes snapshot to the one or more target side hosts in the data protection environment based on changes tracked in a data protection appliance in the data protection environment.

3. The method of claim 2
    wherein performing the continuous data protection replication comprises splitting, by the source side host, I/Os to the data protection appliance in the data protection environment; and
    wherein shipping a changes snapshot to the one or more target side hosts in the data protection environment based on changes tracked in the data protection appliance in the data protection environment comprises:
        creating a snapshot of the source side host in the data protection environment; and
        determining differences between the snapshot of the source side host and one or more of the target side hosts.

4. The method of claim 3 wherein determining differences between the snapshot of the source side host and the one or more target side hosts comprises:
    continuing to split I/Os to the data protection appliance prior to enabling the changed block tracking replication in the data protection environment;
    stopping splitting I/Os to the data protection appliance after creating the snapshot of the source side host in the data protection environment; and
    determining changes stored in a delta marking stream of the data protection appliance in the data protection environment.

5. The method of claim 4 wherein determining changes stored in the delta marking stream of the data protection appliance in the data protection environment comprises:
- determining a first set of changes in the delta marking stream made prior to creation of the snapshot of the source side host in the data protection environment; and
- determining a second set of changes in the delta marking stream from I/Os split to the data protection appliance after creation of the snapshot of the source side host in the data protection environment.

6. The method of claim 1 further comprising:
- determining a first state of data protection performance in the data protection environment performing the continuous data protection replication; and
- determining data protection performance would be improved for the data protection environment by transitioning to the changed block tracking replication.

7. The method of claim 1 further comprising:
- transitioning from the changed block tracking replication to the continuous data protection replication in the data protection environment; and
- performing the continuous data protection replication in the data protection environment.

8. The method of claim 7 wherein transitioning from the changed block tracking replication to the continuous data protection replication in the data protection environment comprises:
- enabling splitting I/Os to a data protection appliance in the data protection environment;
- shipping a snapshot of the source side host in the data protection environment to the one or more target side hosts in the data protection environment; and
- disabling the changed block tracking replication in the data protection environment.

9. The method of claim 8 wherein shipping the snapshot of the source side hot in the data protection environment to the one or more target side hosts in the data protection environment comprises:
- creating the snapshot of the source side host; and
- shipping the snapshot of the source side host to the one or more target side hosts using the changed block tracking replication.

10. The method of claim 9 wherein transitioning from the changed block tracking replication to the continuous data protection replication in the data protection environment comprises:
- determining a first state of data protection performance in the data protection environment performing the changed block tracking replication; and
- determining data protection performance would be improved for the data protection environment by transitioning to the continuous data protection replication.

11. A system comprising:
- a splitter;
- a source side host volume;
- a data protection appliance; and
- computer program code configured to perform the operations of:
  - performing, by a source side host, continuous data protection replication to replicate data to one or more target side hosts in a data protection environment;
  - transitioning, by the source side host, from the continuous data protection replication to changed block tracking replication in the data protection environment; and
  - performing, source side host, the changed block tracking replication to replicate the data to the one or more target side hosts in the data protection environment.

12. The system of claim 11 wherein transitioning from the continuous data protection replication to the changed block tracking replication in the data protection environment comprises:
- enabling, by the source side host, the changed block tracking replication in the data protection environment; and
- shipping, by the source side host, a changes snapshot to one or more target side hosts in the data protection environment based on changes tracked in the data protection appliance in the data protection environment.

13. The system of claim 12
- wherein performing the continuous data protection replication in the data protection environment comprises splitting, by the source side host, I/Os to the data protection appliance in the data protection environment; and
- wherein shipping a changes snapshot to the one or more target side hosts in the data protection environment based on changes tracked in the data protection appliance in the data protection environment comprises:
  - creating a snapshot of the source side host in the data protection environment; and
  - determining differences between the snapshot of the source side host and the one or more target side hosts.

14. The system of claim 13 wherein determining differences between the snapshot of the source side host and the one or more target side hosts comprises:
- continuing to split I/Os to the data protection appliance prior to enabling the changed block replication tracking in the data protection environment;
- stopping splitting I/Os to the data protection appliance after creating the snapshot of the source side host in the data protection environment; and
- determining changes stored in a delta marking stream of the data protection appliance in the data protection environment.

15. The system of claim 14 wherein determining changes stored in a delta marking stream of the data protection appliance in the data protection environment comprises:
- determining a first set of changes in the delta marking stream made prior to creation of the snapshot of the source side host in the data protection environment; and
- determining a second set of changes in the delta marking stream from I/Os split to the data protection appliance after creation of the snapshot of the source side host in the data protection environment.

16. The system of claim 11 further comprising computer program code configured to perform the operations of:
- determining a first state of data protection performance in the data protection environment performing the continuous data protection replication; and
- determining data protection performance would be improved for the data protection environment by transitioning to the changed block tracking replication.

17. The system of claim 11 further comprising computer program code configured to perform the operations of:
- transitioning from the changed block tracking replication to the continuous data protection replication in the data protection environment; and
- performing the continuous data protection replication in the data protection environment.

18. The system of claim 17 wherein transitioning from the changed block tracking replication to the continuous data protection replication in the data protection environment comprises:

enabling splitting I/Os to a data protection appliance in the data protection environment;

shipping a snapshot of the source side host in the data protection environment to a one or more target side hosts in the data protection environment; and disabling the changed block tracking replication in the data protection environment.

19. The system of claim 18 wherein shipping the snapshot of the source side host in the data protection environment to the one or more target side hosts in the data protection environment comprises:

creating the snapshot of the source side host; and shipping the snapshot of the source side host to the one or more target side hosts using the changed block tracking replication.

20. The system of claim 19 wherein transitioning from the changed block tracking replication to the continuous data protection replication in the data protection environment comprises:

determining a first state of data protection performance in the data protection environment performing the changed block tracking replication; and determining data protection performance would be improved for the data protection environment by transitioning to the continuous data protection replication.

21. A computer program product including a non-transitory computer-readable storage medium having computer program code encoded thereon that when executed on a processor of a computer causes the computer to transition between replication technologies, the computer program code comprising:

computer program code for performing, by a source side host, continuous data protection replication to replicate data to one or more target side hosts in a data protection environment;

computer program code for transitioning, by the source side host, from the continuous data protection replication to changed block tracking replication in the data protection environment; and computer program code for performing, by the source side host, changed block tracking replication to replicate the data to the one or more target side hosts in the data protection environment.

* * * * *